United States Patent [19]

Krattiger

[11] Patent Number: 5,105,952
[45] Date of Patent: Apr. 21, 1992

[54] COMPACT DISC STORAGE AND DISPLAY DEVICE

[76] Inventor: Donald G. Krattiger, 25702 N. Vista Fairways, Valencia, Calif. 91355

[21] Appl. No.: 663,564

[22] Filed: Mar. 4, 1991

[51] Int. Cl.⁵ .............................................. A47F 7/00
[52] U.S. Cl. ......................................... 211/41; 211/94
[58] Field of Search ................. 211/40, 41, 87, 88, 211/94; 40/124

[56] References Cited

U.S. PATENT DOCUMENTS

| | | | |
|---|---|---|---|
| 3,337,059 | 8/1967 | Le Hoy | 211/40 X |
| 4,102,458 | 7/1978 | Fors | 211/40 X |
| 4,290,530 | 9/1981 | Wooster | 211/40 |
| 4,350,252 | 9/1982 | Hopkins et al. | 211/40 |
| 4,441,300 | 4/1984 | Varon et al. | 211/87 X |
| 4,867,306 | 9/1989 | Factor | 211/40 X |
| 4,919,287 | 4/1990 | Haskett et al. | 211/41 |
| 4,928,818 | 5/1990 | Friess et al. | 211/40 X |
| 4,940,147 | 7/1990 | Hunt | 211/40 |
| 4,951,826 | 8/1990 | Tompkins | 211/41 X |
| 4,976,353 | 12/1990 | Stickel et al. | 211/41 |

Primary Examiner—Reinaldo P. Machado
Assistant Examiner—Sarah A. Lechok
Attorney, Agent, or Firm—Rapkin, Gitlin & Moser

[57] ABSTRACT

A device for storing and displaying compact discs comprising a series of horizontally interconnecting elongated rigid display panels, which may vary in length and are assembled vertically. Each panel member includes a forward and rearward surface and upper and lower edge portions which incorporate the means used to couple each member to the one next adjacent. The rearward surface, which is generally flat, contains a means to mount each member separately to a vertical flat surface, such as a wall. The member is mounted against the flat surface so that the lower portion of each said member is positioned at a slight acute angle relative to the surface of the wall. Along the upper edge of each panel member is a top guide ridge member which includes an edge and a lip extending around the edge surface for releasably retaining each compact disc case on the display rack. Along the lower edge of each panel member is a base upon which the bottom edge of each compact disc case rests when stored and on display.

3 Claims, 2 Drawing Sheets

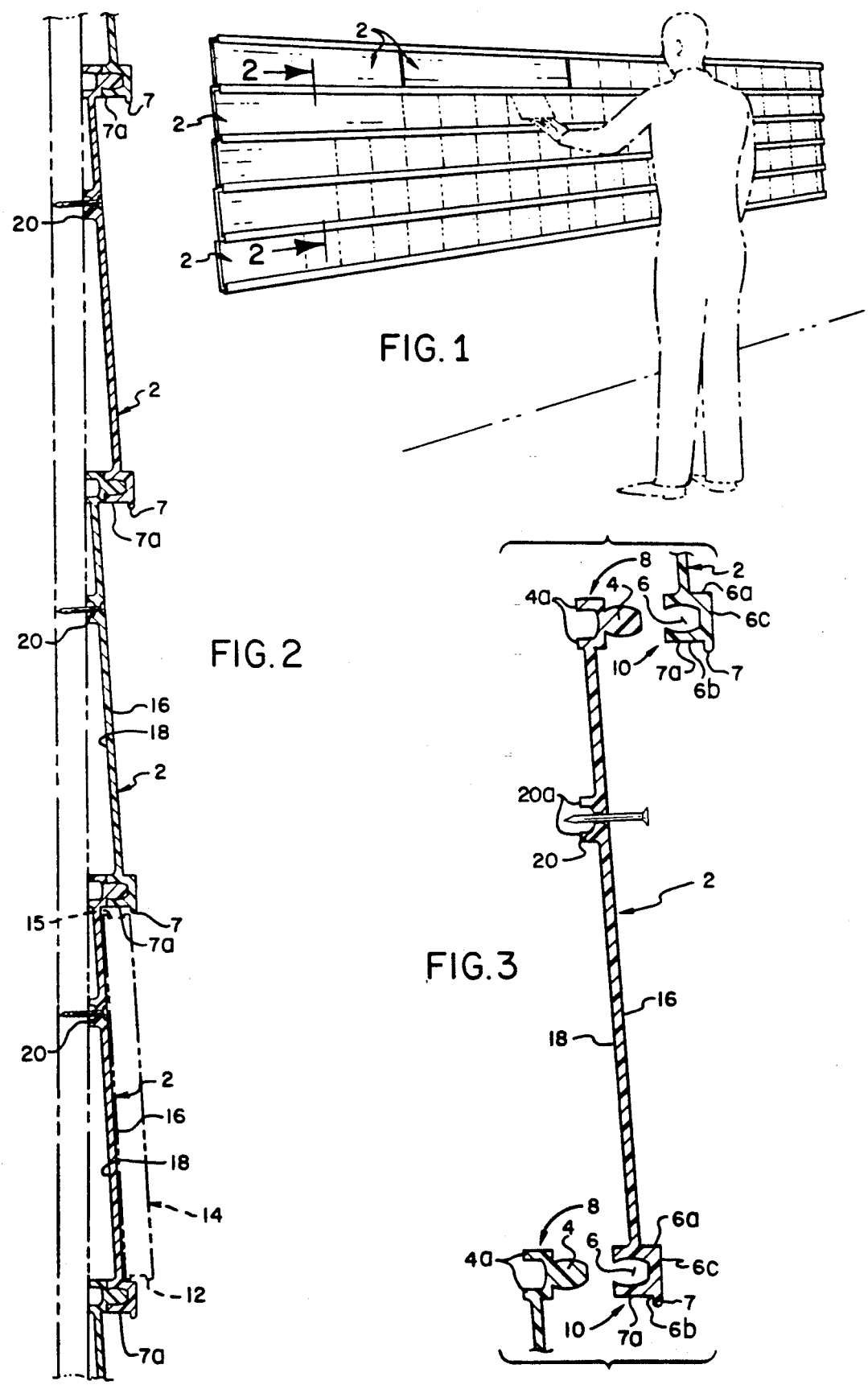

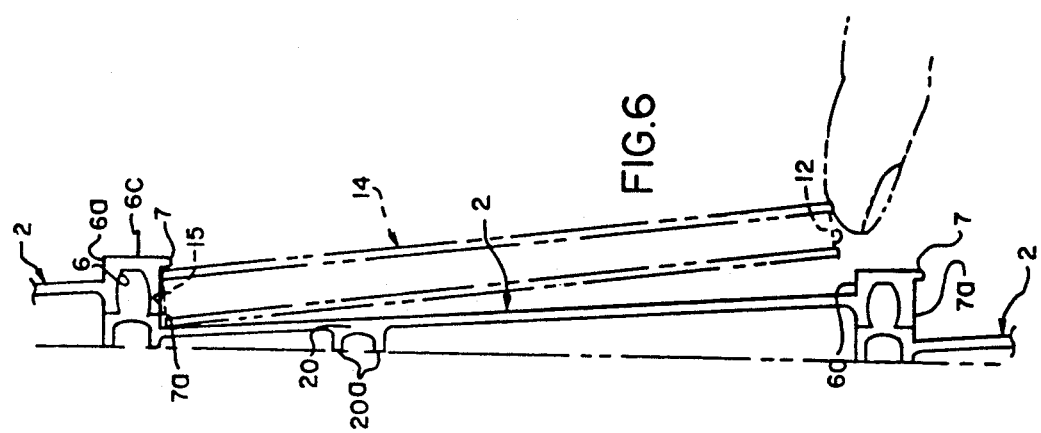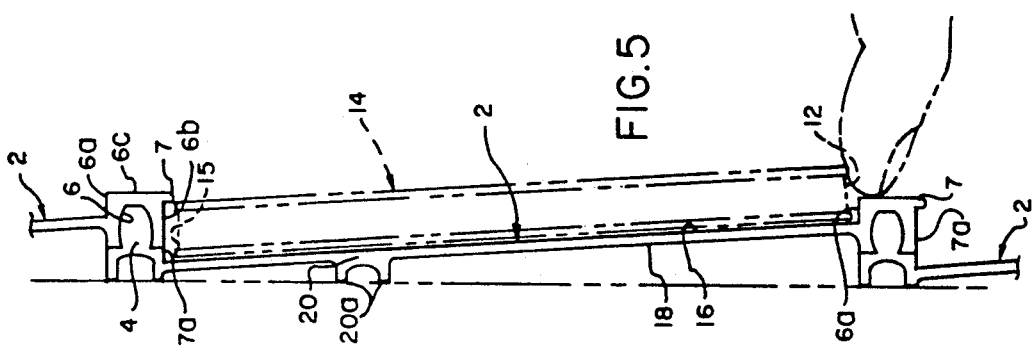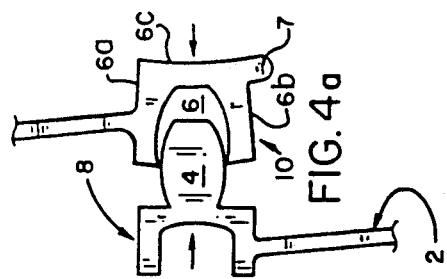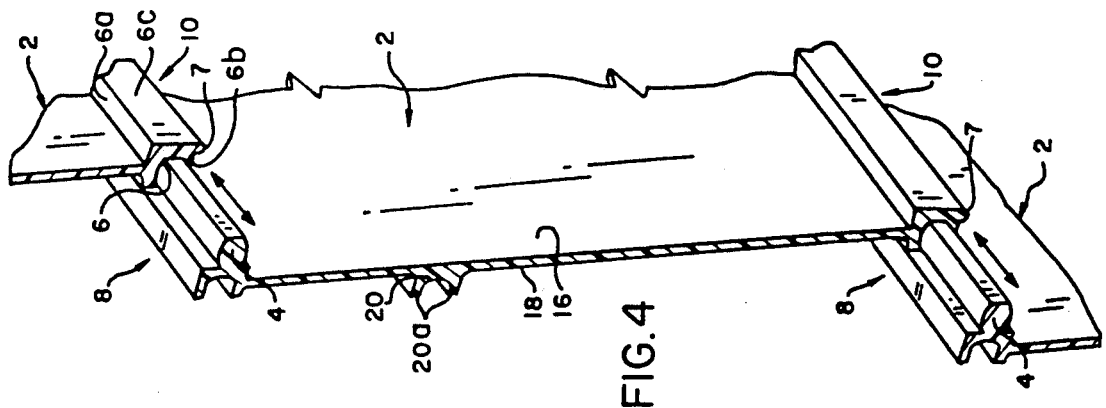

COMPACT DISC STORAGE AND DISPLAY DEVICE

FIELD OF THE INVENTION

This invention relates generally to the field of display and storage assemblies and more particularly to an apparatus for storing and displaying compact discs of the type that contain audio musical performances.

DESCRIPTION OF THE PRIOR ART

Compact discs, which are fast becoming the medium of preference for the recording and performance of music, are housed within a small storage case which measures approximately 5" on all sides. The case is typically fabricated of plastic and includes a door, which must be opened to gain access to the compact disc inside. The door also contains a graphic similar to the graphic depictions normally associated with the covers of the once market dominant long playing record albums. Due to the relatively small size of the case and the depiction of an array of interesting and attractive graphics thereon, it has become desirable to store the cases on free standing or wall mounted racks or boards. This allows the cases, particulary the unique graphics contained on the inside of the covers, to be displayed in a decorative fashion. With the ability to easily interchange and arrange the cases on the display rack, a variety of interesting and unique designs are achieved to further enhance the musical environment.

Racks used for this purpose also enable the user to quickly scan a variety of discs and select one with little effort. Unlike the selection process in choosing a compact disc or a been arranged side by side or piled high on a shelf or inside a cabinet, using the apparatus of the present invention is easily the more efficient and appealing alternative.

The present invention provides a device which clearly overcomes the drawbacks associated with the prior art. For example, Hunt U.S. Pat. No. 4,940,147 and Tompkins U.S. Pat. No. 4,951,826 disclose compact disc display and storage racks which involve the use of loop pile or hook and pile fasteners (known by the trademark Velcro) to secure compact disc cases to a rack or other mounting surface. The problem with this method is twofold. The first regards the difficulty in arranging and rearranging the cases in different patterns due to the relatively tight and somewhat inflexible connection between each case and the rack. The second regards the inconvenience and additional work involved in the user having to mount mating fasteners to the back of a display case each time there is an addition to the collection. It is widely known in the trade that compact disc cases are typically not sold with either of the fastener means disclosed by Hunt or Tompkins.

In accordance with the present invention it has been determined that it is quite desirable to provide an expandable device which stores, securely holds and displays compact discs more effectively than have the prior art devices, while at the same time enabling the user to remove, replace and arrange the cases with ease and without the need for any extrinsic fasteners, particularly those that are required to be permanently affixed to the case itself.

SUMMARY OF THE INVENTION

The present invention constitutes a device for storing and displaying compact discs comprising a series of horizontally elongated rigid display panels, which may vary in length and are assembled vertically through the utilization of bead and groove couplings. Each panel member includes a forward and rearward surface and upper and lower edge portions which incorporate the respective bead and groove means used to couple each member to the one next adjacent. The rearward surface, which is generally flat, contains a means to mount each member separately to a vertical flat surface, such as a wall. The member is mounted against the flat surface so that the lower portion of each said member is positioned at a slight acute angle relative to the surface of the wall. Along the upper edge of each panel member is a top guide ridge member which includes an edge and a lip extending around the edge surface for releasably retaining each compact disc case on the display rack. Along the lower edge of each panel member is a base upon which the bottom edge of each compact disc case rests when stored and on display. Both the top guide ridge member and the base portion are defined by the housing which forms the groove element of the bead and groove coupling.

The compact disc case is placed and held securely on the rack by inserting and guiding the uppermost edge of the case towards the top of the forward surface and within the area defined by the lip. When the bottom edge of the case clears the space immediately above the base, the case is instantly moved against the forward surface and lowered gently until it rests on the surface of the base below. The lip and base working in concert together with the influence of the slightly acute angle of each panel relative to the vertical mounting surface combine to ensure the stability of each case on the rack. The removal of a case simply requires the user to apply slight upward pressure along the bottom of the compact disc case protruding from beyond the front edge of the base until that section is lifted clear of the base surface. Using the fingers as a guide, the case is then gently pulled forward towards the user and then lowered to allow the top section of the case to clear the area defined by the lip. At this point, the user simply grasps the case using two or more fingers to remove it entirely from the rack.

Accordingly, it is an object of the present invention to provide a device for storing and displaying one or more compact disc cases which incorporates means to enable the easy removal of the case.

Another object of the present invention is to provide a device for storing and displaying one or more compact discs which may be free standing or wall mounted.

Still another object of the present invention is to provide a device for storing and displaying one or more compact disc cases that insures that the cases will remain stable on the device without the need for the attachment of independent fastener means.

Still yet another object of the present invention is to provide a device for storing and displaying one or more compact disc cases which is easy and cost effective to manufacture.

Still yet another object of the present invention is to provide a device for storing and displaying one or more compact disc cases which is easy to install, remove and use.

Still yet another object of the present invention is to provide a device for storing and displaying one or more compact disc cases which enables the user to arrange the compact disc cases to best display the graphics thereon in an interesting and unique manner.

Other objects and advantages of the present invention will become apparent in the following specifications when considered in light of the attached drawings wherein a preferred embodiment of the invention is illustrated.

A BRIEF DESCRIPTION OF THE DRAWINGS

FIG. 1 is a perspective view of a plurality of attached display panel members in accordance with the present invention.

FIG. 2 is a cross-section of the device of the present invention shown along lines 2—2 of FIG. 1.

FIG. 3 is a cross-section of the device of the present invention with emphasis on the bead and groove coupling associated with each panel member.

FIG. 4 is a plan view of a portion of a panel member in accordance with the present invention demonstrating the attachment of one member to another utilizing the bead and groove couplings.

FIG. 4a is a side view of a portion of two adjoining panel members in accordance with the present invention demonstrating the attachment of one member to the other utilizing the snap-on version of the bead and groove coupling.

FIGS. 5 and 6 are side elevational views of the device in accordance with the present invention depicting the preferred manner in which a compact disc case is positioned on and removed from the display panel.

DETAILED DESCRIPTION OF THE PREFERRED EMBODIMENT

The device of the present invention for storing and displaying compact discs, more particularly compact disc cases, is shown by example in FIG. 1. The illustrated example includes a plurality of elongated rigid display panels 2, which may be used in a variety of lengths depending upon the specific requirements of the user. Panel 2 typically has a horizontal orientation, although a plurality of panels are assembled vertically through the utilization of bead and groove couplings 4 and 6, respectively, which are physically integrated into the top and bottom edges of each panel. Panel 2 includes an upper edge 8 and a lower edge 10. Thus, for purposes of example only, bead 4 may be physically integrated along the entire length of upper edge 8 and groove coupling 6 may be physically integrated along the entire length of lower edge 10. As indicated, the actual physical location of the bead and groove elements of the respective couplings may be reversed so that, for example, the bead 4 may be integrated into the lower edge 10 and the groove 6 may be fabricated along the upper edge 8.

The exterior walls of the housing which forms or defines groove 6 is comprised of horizontal upper and lower surfaces 6a and 6b, respectively, and a vertical side wall 6c, which connects surfaces 6a and 6b. Upper surface 6a acts as a support ledge upon which the bottom edge 12 of a compact disc case 14 can rest in the display and storage mode. The depth of upper surface 6a is slightly less than the thickness of a typical compact disc case to allow the fingers immediate access and ease of maneuverability when placing or removing case 14 relative to panel 2. Vertical sidewall 6c extends downwardly approximately ⅛" to ¼" beyond the lower surface 6b to serve as a barrier or lip 7 for restricting the forward movement of the top section 15 of the compact disc case 14, thus, ensuring the stability of the case 14 relative to any accidental or unintended movement away from the display panel 2.

Each panel 2 includes a front surface 16 and a rear surface 18. Surface 16, in substantial part, serves as a support medium for the case 14 when the case is in the display and storage mode. Surface 18 supports a member 20, which is used for mounting the panel to any suitable vertical surface, such as a wall. Member 20 may be in the form of any conventional device used for this intended purpose, although, as will be shown, the length of member 20 as it projects away from the rear surface 18 towards the vertical mounting surface can be a significant feature of the present invention. Thus, the end points 4a and 20a (See FIGS. 3, 5 and 6) must, when mounting the panel 2 on the vertical surface, be aligned along and flush against an approximate 90 degree axis to enable the panel to be situated against the vertical mounting surface to achieve the requisite acute angle of inclination for surface 16 relative to the vertical mounting surface. The preferred acute angle of inclination of the front surface 16 is approximately 80 degrees, which is sufficient to ensure the stability of the compact disc case 14 in the display and storage mode. Although there is a certain degree of flexibility allowable relative to this angle of inclination, the optimum effectiveness and benefits derived from the assembly of the present invention is achieved by ensuring that the vertical orientation of each of the panels can accommodate the compact disc cases in order to present them in the most attractive and unique fashion. To accomplish this, the graphics depicted upon each of the cases must be displayed at the maximum level of visibility without jeopardizing the stability of the case as it rests upon the panel.

The typical compact disc is approximately 4½" in diameter and is housed within a case which measures approximately 5" on all sides. The average thickness of the case is about ⅜", or just under ½". The case 14 is typically fabricated of plastic and usually includes a transparent door, which must be opened to gain access to the compact disc inside. The door also contains a graphic similar to the graphic depictions normally seen on the covers of long playing record albums. It is the combination of these graphics, which include an array of unique designs and a wide variety of color combinations, that serves as the impetus for the present invention. An arrangement of the unique and interesting designs associated with so many of the popular compact discs that are available on the market today serve to enhance the music environment in which these discs are played. Entire wall surfaces may be covered by these individual panels using panels of a variety of lengths. Window and door frames are easily circumvented by purchasing or, where necessary, customizing panels to achieve the desired length to accommodate the variety of different shapes and sizes available.

In practice, and with reference only to the example of an individual panel unit, a compact disc case 14 is placed against the front surface 16 of a section of panel 2 and then lifted so that the edge of the top section 15 of case 14 can be maneuvered into the slot 7a defined by lower surface 6b and lip 7. The bottom edge 12 of the case 14 is then eased into position onto the bottom protruding edge 6a of the panel 2 and lowered there for rest and support. Lip 7 working to restrain the edge of section 15, together with the effect brought about by the proper acute angle of inclination of surface 16 relative to the vertical wall mounting surface, ensures against random and unintended forward movement of the case 14 when placed in the storage and display mode. To remove case 14 from the panel, one need only to slide a couple of fingers underneath the protruding front edge 12 and then lift up slightly and out to allow the case 14 to fall freely away from the panel.

It is to be understood that the disclosed embodiments are merely exemplary of the invention, which may be embodied in various forms. Therefore, specific structural and functional details herein are not to be interpreted as limiting, but merely as a basis for the claims and as a representative basis for teaching one skilled in the art to employ the present invention in virtually any appropriately detailed structure.

I claim:

1. Visual device for storing and displaying one or more compact discs comprising:
    a. one or more vertically adjacent generally rigid and elongated panel members each having a forward surface and a rearward surface and upper and lower edge portions;
    b. means for mounting said device against a vertical flat surface;
    c. means formed integral with each said display panel member for releasable coupling with the vertically next adjacent display member to form a generally continuous wall of said display panel members, said means including at least one bead element defined along one said edge portion of each said display panel member and at least one groove element defined along the other said edge portion of each said display panel member for engaging the corresponding groove and bead elements defined at the respective edge portions of the vertically next adjacent display panel members, said groove element being formed within an elongated external housing coextensive therewith; and
    d. means defining an interior space adapted to receive and support one or more compact discs, said means including said forward surface in partial spaced relation with the vertical mounting surface at an acute angle of inclination thereto to enable the assistance of the force of gravity to maintain the disc in place, a base portion defined by the upper surface of the housing which forms the groove element and having a depth less than the average thickness of a typical compact disc case the lower portion of which rests upon and extends beyond the outer edge of said base, and a top guide ridge member defined by the lower surface of the vertically next adjacent display panel member, said top guide ridge member including an edge, and a lip extending around the edge surface for releasably retaining said compact disc within said interior space.

2. The device of claim 1 wherein the bead and groove elements are adapted for slidable engagement in order to form a coupling.

3. The device of claim 1 wherein the bead and groove elements are adapted to snap together in order to form a coupling.

* * * * *